United States Patent
Lynam et al.

(10) Patent No.: US 6,971,775 B2
(45) Date of Patent: Dec. 6, 2005

(54) LIGHT MODULE FOR INTERIOR REARVIEW MIRROR ASSEMBLY

(75) Inventors: Niall R. Lynam, Holland, MI (US); John O. Lindahl, Fruitport, MI (US); Rick Mousseau, Holland, MI (US)

(73) Assignee: Donnelly Corporation, Holland, MI (US)

( * ) Notice: Subject to any disclaimer, the term of this patent is extended or adjusted under 35 U.S.C. 154(b) by 26 days.

(21) Appl. No.: 10/745,056

(22) Filed: Dec. 22, 2003

(65) Prior Publication Data

US 2004/0196661 A1 Oct. 7, 2004

Related U.S. Application Data

(60) Provisional application No. 60/436,259, filed on Dec. 23, 2002.

(51) Int. Cl.$^7$ .............................. B60Q 1/26; B60Q 1/24; B60R 1/12
(52) U.S. Cl. ....................... 362/494; 362/640; 362/546; 362/310; 362/364; 362/135
(58) Field of Search ................................ 362/494, 226, 362/640, 488, 490, 546, 310, 364, 135; 439/34; 174/72 A; 200/61.27, 61.54

(56) References Cited

U.S. PATENT DOCUMENTS

| | | | | |
|---|---|---|---|---|
| 2,273,613 A | * | 2/1942 | Bartoe ......................... | 427/164 |
| 4,646,210 A | | 2/1987 | Skogler et al. .............. | 362/142 |
| 4,733,336 A | | 3/1988 | Skogler et al. .............. | 362/142 |
| 4,807,096 A | | 2/1989 | Skogler et al. .............. | 362/142 |
| 5,178,448 A | | 1/1993 | Adams et al. ............... | 362/83.1 |
| 5,649,756 A | | 7/1997 | Adams et al. ............... | 362/83.1 |
| 5,669,698 A | | 9/1997 | Veldman et al. ............ | 362/83.1 |
| 5,673,994 A | | 10/1997 | Fant, Jr. et al. ............. | 362/83.1 |
| 5,813,745 A | | 9/1998 | Fant, Jr. et al. ............. | 362/83.1 |
| 5,823,654 A | * | 10/1998 | Pastrick et al. .............. | 362/494 |
| 6,042,253 A | | 3/2000 | Fant, Jr. et al. ............. | 362/494 |
| 6,124,886 A | * | 9/2000 | DeLine et al. ............... | 348/148 |
| 6,318,870 B1 | | 11/2001 | Spooner et al. .............. | 359/872 |
| 6,329,925 B1 | | 12/2001 | Skiver et al. ................ | 340/815.4 |
| 6,331,066 B1 | | 12/2001 | Desmond et al. ............ | 362/494 |
| 6,428,172 B1 | | 8/2002 | Hutzel et al. ................. | 359/838 |
| 6,501,387 B2 | | 12/2002 | Skiver et al. ................ | 340/815.4 |
| 6,690,268 B2 | | 2/2004 | Schofield et al. ............ | 340/438 |
| 2002/0159270 A1 | | 10/2002 | Lynam et al ................ | 362/492 |
| 2003/0117728 A1 | | 6/2003 | Hutzel et al. ................. | 359/838 |
| 2003/0169522 A1 | | 9/2003 | Schofield et al. ............ | 359/876 |

\* cited by examiner

*Primary Examiner*—Alan Cariaso
*Assistant Examiner*—Sharon Payne
(74) *Attorney, Agent, or Firm*—Van Dyke, Gardner, Linn & Burkhart, LLP

(57) ABSTRACT

A light module for an interior rearview mirror assembly is positionable at least partially within the mirror casing. The light module includes an illumination source, a housing generally surrounding the illumination source, and a cover generally encasing the illumination source within the housing. The light module includes an electrical connector for electrically connecting the light module to an electrical conductor of the mirror assembly when the light module is positioned at least partially within the mirror casing. The light module may include a user actuatable input for activating and deactivating the illumination source. The electrical connector may comprise conductive elements that are molded within a polymeric housing. The conductive elements may include light contacts for electrically contacting the illumination source and may be configured to support the illumination source. The illumination source may comprise a festoon light source.

8 Claims, 2 Drawing Sheets

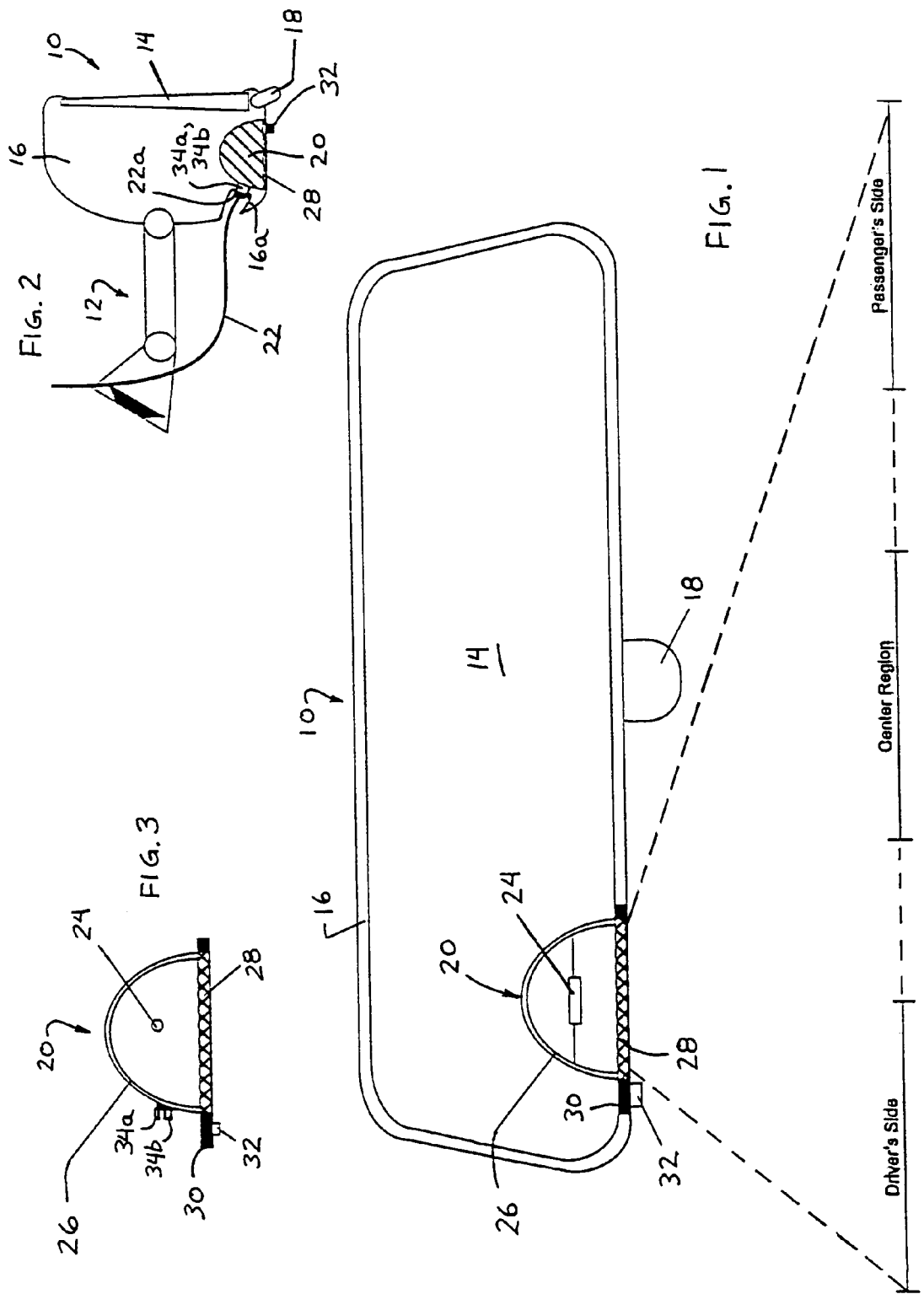

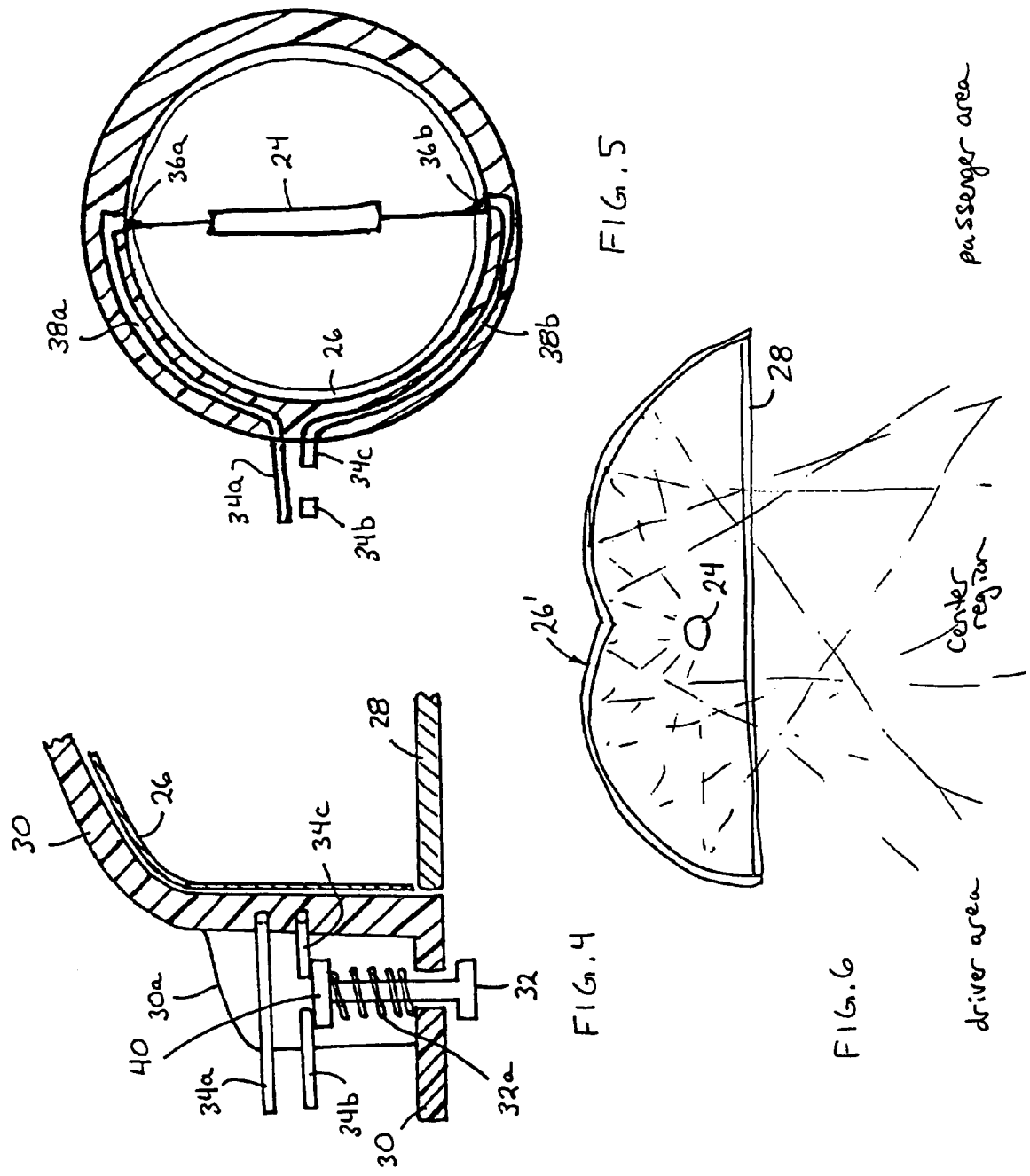

LIGHT MODULE FOR INTERIOR REARVIEW MIRROR ASSEMBLY

CROSS REFERENCE TO RELATED APPLICATION

The present application claims priority of U.S. provisional application Ser. No. 60/436,259, filed Dec. 23, 2002, which is hereby incorporated herein by reference in its entirety.

FIELD OF THE INVENTION

The present invention relates generally to the field of lighting for interior rearview mirror assemblies and, more particularly, to the economic provision of a light source to an interior rearview mirror assembly, more particularly to a low cost prismatic interior rearview mirror assembly.

BACKGROUND OF THE INVENTION

It is well known in the automotive mirror art to provide a light source in an interior rearview mirror assembly, such as described in U.S. Pat. Nos. 4,646,210; 4,733,336; 4,807,096; 5,813,745; 6,042,253; 5,669,698; 5,673,994; and 5,649,756, which are hereby incorporated herein by reference. Such lighted mirror assemblies work for their intended purposes.

Typically, prismatic interior rearview mirror assemblies include a flip mechanism or toggle, which flips or toggles the mirror reflective element between a full reflectivity daytime position and a reduced reflectivity nighttime position, such as the toggle assembly disclosed in U.S. Pat. No. 6,318,870, which is hereby incorporated herein by reference. Some mirror assemblies include other forms of flip or toggle mechanisms, such as a rotary type mechanism, such as disclosed in U.S. Pat. No. 6,329,925, which is hereby incorporated herein by reference, or the like. Because of economy and to ease manufacturing of the interior rearview mirror assembly, it is desirable to have a polypropylene, unitary or one-piece case, rather than a casing that involves separate molding of a bezel portion and a non-bezel portion of the casing, which are then joined together in a separate operation, such as via snapping or otherwise joining or adhering, such as via sonic bonding or adhesion or the like, the portions together. Because the toggle assembly or tab or rotary mechanism is typically positioned at a central region of the mirror assembly, a map reading light or lamp may typically be positioned at each side of the toggle assembly to provide illumination usable by front seat occupants, such as, for example, for reading purposes, such as map reading or the like, and/or for courtesy illumination or the like and/or for illumination of accessories or controls or the like of the vehicle.

SUMMARY OF THE INVENTION

The present invention is intended to provide a completely workable and usable light module to a low cost prismatic interior rearview mirror assembly. The light module comprises a unitary light module which may be installed into a unitarily molded casing of the interior rearview mirror assembly to provide a low cost light module for the mirror assembly.

According to an aspect of the present invention, an interior rearview mirror assembly for a vehicle includes a mirror casing, a reflective element, and a light module. The light module is positionable at least partially within the mirror casing. The light module comprises an illumination source, a housing generally surrounding the illumination source, and a cover generally encasing the illumination source within the housing. The light module includes an electrical connector for electrically connecting the light module to an electrical conductor (such as a wire, a stamping or a conductive prong or the like) of the mirror assembly when the light module is positioned at least partially within the mirror casing. The light module includes a user actuatable input for activating and deactivating the illumination source.

The housing may comprise a polymeric material and the electrical connector may comprise conductive elements that are molded within the housing. The conductive elements may include light contacts for electrically contacting the illumination source. The light contacts may be exposed at an inner surface of the housing for contacting the illumination source, and may be configured to support the illumination source. Optionally, the illumination source may comprise a festoon light source.

Therefore, the present invention provides a unitary light module that may be inserted into or attached to or at least partially within a mirror casing of an interior rearview mirror assembly. The unitary light module may be installed at an interior rearview mirror assembly and connected to an electrical conductor at the mirror assembly, whereby the unitary light module comprises a completely workable and usable light module requiring only electrical connection to the wire harness or power source. The light module thus may provide a low cost light module to a low cost prismatic interior rearview mirror assembly, without requiring additional electrical controls or components or connections. The unitary light module of the present invention thus may be provided by a separate light module manufacturer than the mirror manufacturer, and may be installed within the casing of the mirror assembly without requiring any additional connections or controls. The light module of the present invention thus facilitates the provision of a low cost light module to a low cost interior rearview mirror assembly, while avoiding the additional components and processes of the prior art mirror assemblies.

These and other objects, advantages, purposes and features of the present invention will become apparent upon review of the following specification in conjunction with the drawings.

BRIEF DESCRIPTION OF THE DRAWINGS

FIG. 1 is a front elevation of an interior rearview mirror assembly having a light module in accordance with the present invention;

FIG. 2 is a side elevation of the interior rearview mirror assembly of FIG. 1;

FIG. 3 is a side elevation and partial sectional view of the light module of the present invention;

FIG. 4 is a partial sectional view of the light module of the present invention, showing the electrical terminals and switch;

FIG. 5 is a partial sectional view of the light module of the present invention, showing the electrical connectors molded within a housing of the module; and FIG. 6 is a partial sectional view of another light module in accordance with the present invention, having a compound reflector for reflecting and directing light in desired directions.

DESCRIPTION OF THE PREFERRED EMBODIMENTS

Referring now to the drawings and the illustrative embodiments depicted therein, an interior rearview mirror assembly 10 is pivotally mounted to an interior portion of a vehicle, such as via a double ball mounting assembly 12 (FIGS. 1 and 2). Mirror assembly 10 includes a prismatic reflective element 14 and a housing or casing 16 and a toggle or flip mechanism or assembly 18 for pivoting the casing 16 and reflective element 14 between a full reflectivity daytime position and a reduced reflectivity nighttime position, as is known in the mirror art. Mirror assembly 10 includes a light module 20 positioned to the side of the toggle mechanism 18 (such as on the side of the mirror assembly toward the driver side of the vehicle, as shown in FIGS. 1 and 2). Light module 20 is configured to snap or otherwise secure within casing 16, as discussed below, and preferably is removably secured so that the module may be detached for replacement or service. Light module 20 is operable to direct illumination, such as toward the driver seating area, the passenger seating area and/or the position or area between the driver and passenger (sometimes referred to as the center floor console area) of the vehicle when the mirror assembly 10 is mounted at an interior portion of the vehicle, such as at an interior surface of a windshield of the vehicle. The interior rearview mirror assembly may include other accessories as well, without affecting the scope of the present invention.

Toggle mechanism 18 may include a toggle member, which may be pivotally connected to the mounting assembly 12 that is mounted to the vehicle to provide pivotal movement of the mirror holder and reflective element relative to the vehicle, as is known in the automotive mirror art. The toggle member may be actuated or moved by a user to adjust the mirror holder and reflective element relative to the vehicle. Optionally, the toggle member may comprise a soft touch surface or portion, such as disclosed in U.S. Pat. No. 6,318,870, which is hereby incorporated herein by reference. The mounting portion may be mounted to the vehicle, such as to an interior surface of the vehicle windshield or to a header portion of the vehicle or the like, via any mounting arm and button or any other mounting arrangement, such as the types disclosed in U.S. Pat. Nos. 5,671,996; 5,813,745; 5,673,994; 5,820,097; 5,708,410; 5,576,687; 5,521,760; 5,330,149; 5,100,095; 5,058,851; 4,930,742; 4,936,533; 4,436,371; 4,524,941; 4,435,042; and/or 4,646,210, which are hereby incorporated by reference herein, without affecting the scope of the present invention. Although shown as having a double ball mounting arrangement, the mirror assembly may comprise a single ball mounting arrangement or other mounting arrangement, without affecting the scope of the present invention.

Casing 16 of interior rearview mirror assembly 10 preferably comprises a unitary or one-piece casing (preferably molded from a thermoplastic resin, such as polypropylene or the like), which may be molded or otherwise formed, and which receives the prismatic reflective element therein. Optionally, the toggle mechanism of the double ball mounting arrangement (preferably with a double ball support arm and mirror mount included therewith) may be secured or attached to casing 16. Preferably, the prismatic reflective element 14 is secured into place in the casing while the molded casing (preferably the freshly molded casing) is still warm and pliable, such as disclosed in U.S. Pat. No. 4,436,371, issued to Wood et al., or in U.S. patent application Ser. No. 10/456,599, filed Jun. 6, 2003 by Weller et al. for INTERIOR REARVIEW MIRROR SYSTEM WITH COMPASS, which are hereby incorporated herein by reference. When the molded casing (preferably the freshly molded casing and thus just exiting the injection molding press, or alternately, and less desirably, a heated casing having been heated, such as in an oven or the like, to make the casing warm and pliable) cools and shrinks, the casing grips around the prismatic reflective element to retain the reflective element in the assembly.

Casing 16 may be formed or molded to have a cavity or opening at a bottom region thereof for receiving the light module 20, as discussed below. Such opening may include structure that cooperates with the structure on the light module 20 to enable detachable securing of light module 20 to casing 16. For example, light module 20 may be detachably secured to casing 16 at the opening in a manner similar to that described in U.S. Pat. No. 4,733,336, which is hereby incorporated herein by reference. Casing 16 may also have an aperture or receiving structure or pocket 16a (FIG. 2), for guiding and/or securing a plug or connector 22a of an electrical conductor or wire harness 22 (which typically carries vehicle ignition/battery voltage to the light module, and may carry other signals as may be appropriate for other accessories in the mirror assembly) and retaining the connector 22a to terminals 34a, 34b of light module 20, thus easing assembly and connection of the light module and obviating the need to purchase separate connectors or plugs. Optionally, but not shown, the double ball mounting assembly (or other type of mounting arrangement) may also provide a passageway therethrough for electrical conductor or wire harness 22 to be threaded therethrough for connecting the light module 20 to a vehicle wire harness (not shown), such as a vehicle wire harness at the headliner of the vehicle, as also discussed below. Electrical conductor 22 may comprise a wire or wire harness (as shown in FIG. 2), or may comprise a stamping or conductive prong or other conductive element or member that may provide an electrical connection to light module 20, such as an electrical conductor that is in electrical connection with a power source of the vehicle or mirror assembly or the like and thus that provides electrical power to the light module, without affecting the scope of the present invention.

Light module 20, as assembled or manufactured in its completed form, discussed below, may be inserted or otherwise secured at and into casing 16, such as in a similar manner as the reflective element is attached as described above, such as via snapping the light module into the casing of the mirror assembly so it is detachable therefrom. It is further envisioned that alternately, and less desirably, the light module may be inserted into the cavity of the casing while the molded casing is still in a warm and pliable state, such as described above. Optionally, casing 16 may comprise a ventilated casing, such as the type disclosed in U.S. Pat. No. 5,673,994, which is hereby incorporated herein by reference. The mirror assembly may have other types of casing or casing components, such as two piece housing assemblies, such as described in U.S. Pat. Nos. 5,178,448; 5,649,756; 6,329,925; and 6,501,387, which are hereby incorporated herein by reference. Optionally, however, the mirror assembly may comprise other types of casings or bezel portions or cap or cover portions or the like, such as described in U.S. Pat. Nos. 6,439,755 and 4,826,289; PCT Application No. PCT/US03/40611, filed Dec. 19, 2003 by Donnelly Corporation et al. for ACCESSORY SYSTEM FOR VEHICLE; and/or U.S. provisional applications, Ser. No. 60/500,858, filed Sep. 5, 2003 by Kulas et al. for INTERIOR REARVIEW MIRROR ASSEMBLY; Ser. No. 60/471,546, filed May 19, 2003 by Uken et al. for MIRROR ASSEMBLY FOR VEHICLE; and Ser. No. 60/525,537, filed Nov. 26, 2003 by Uken et al. for MIRROR ASSEMBLY FOR VEHICLE, which are all hereby incorporated herein by reference.

Light module 20 is suitable for use in a prismatic mirror assembly having a prismatic reflective element, such as a prismatic reflective element of the types described in U.S. Pat. Nos. 6,318,870; 5,327,288; 4,948,242; 4,826,289; 4,436,371; and 4,435,042; PCT Application No. PCT/US03/29776, filed Sep. 19, 2003 by Donnelly Corp. et al. for MIRROR REFLECTIVE ELEMENT ASSEMBLY; and U.S. provisional applications, Ser. No. 60/525,952, filed Nov. 26, 2003 by Lynam for MIRROR REFLECTIVE ELEMENT FOR A VEHICLE; and Ser. No. 60/471,872, filed May 20, 2003 by Lynam for MIRROR REFLECTIVE ELEMENT, which are all hereby incorporated herein by reference, without affecting the scope of the present invention.

Optionally, the light module of the present invention may be attachable or mountable to an electro-optic or electrochromic rearview mirror assembly, which may include an electro-optic or electrochromic reflective element. The electrochromic mirror element of the electrochromic mirror assembly may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent applications, Ser. No. 10/054,633, filed Jan. 22, 2002 by Lynam et al. for VEHICULAR LIGHTING SYSTEM; and/or Ser. No. 09/793,002, filed Feb. 26, 2001, entitled VIDEO MIRROR SYSTEMS INCORPORATING AN ACCESSORY MODULE, now U.S. Pat. No. 6,690,268, and/or PCT Application No. PCT/US03/29776, filed Sep. 9, 2003 by Donnelly Corp. et al. for MIRROR REFLECTIVE ELEMENT ASSEMBLY; PCT Application No. PCT/US03/35381, filed Nov. 5, 2003 by Donnelly Corporation et al. for ELECTRO-OPTIC REFLECTIVE ELEMENT ASSEMBLY; and/or PCT Application No. PCT/US03/40611, filed Dec. 19, 2003 by Donnelly Corporation et al. for ACCESSORY SYSTEM FOR VEHICLE, which are hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 5,668,663 and/or 5,724,187, and/or in U.S. patent applications, Ser. No. 10/054,633, filed Jan. 22, 2002 by Lynam et al. for VEHICULAR LIGHTING SYSTEM; and/or Ser. No. 09/793,002, filed Feb. 26, 2001, entitled VIDEO MIRROR SYSTEMS INCORPORATING AN ACCESSORY MODULE, now U.S. Pat. No. 6,690,268, and/or PCT Application No. PCT/US03/29776, filed Sep. 9, 2003 by Donnelly Corp. et al. for MIRROR REFLECTIVE ELEMENT ASSEMBLY, which are all hereby incorporated herein by reference.

Light module 20 includes an illumination source or light source 24, a reflector 26 generally surrounding the light source 24, and a lens or cover 28. Light module 20 also includes a housing 30 generally surrounding lens or cover 28 and/or reflector 26, a switch or control or button 32 for activating and/or deactivating light source 24, and an electrical connector or electrical terminals 34a, 34b for connecting light module 20 to electrical wire harness 22 of mirror assembly 10. Cover 28 may attach to housing 30 or reflector 26 or to the mirror casing to substantially encase the light source within the housing and/or reflector. Light module 20 provides a unitary module which may be snapped into or otherwise secured to casing 16 of mirror assembly 10 and connected to the electrical wire harness 22, whereby the light module 20 provides a completely usable and workable light module 20, requiring no other controls or connections. The electrical connection of the light module to the electrical conductor or wire harness may be made as the light module is installed or snapped into the mirror assembly, such as via a snap together connection or the like.

Light source 24 may comprise any type of light source, preferably which provides a bright and cool illumination of the targeted area or areas. For example, light source 24 may comprise a festoon light source, described below, such as the type described in U.S. Pat. No. 5,823,654, which is hereby incorporated herein by reference. Optionally, light source 24 may comprise any other type of light source, such as an incandescent light source, a tungsten light source, a xenon light source, a halogen light source or a light emitting diode (LED), such as an organic light emitting diode (OLED) or an inorganic light emitting diode, such as disclosed in U.S. patent applications, Ser. No. 10/054,633, filed Jan. 22, 2002 by Lynam et al. for VEHICULAR LIGHTING SYSTEM; and Ser. No. 09/793,002, filed Feb. 26, 2001, entitled VIDEO MIRROR SYSTEMS INCORPORATING AN ACCESSORY MODULE, now U.S. Pat. No. 6,690,268, which are hereby incorporated herein by reference. Other light sources may be selected, and may be selected and combined with a correspondingly selected reflector and/or lens to direct the light toward a targeted area, without affecting the scope of the present invention.

Optionally, the light source 24 may comprise a festoon light source or bulb, which may comprise an elongated cartridge or element which forms a generally central cylinder having an elongated light radiating surface which extends between two end caps. The two end caps may provide electrical contacts for the bulb and may be supported by a pair of electrically conductive metallic contacts 36a, 36b (FIG. 5) positioned at the reflective surface of the reflector 26. The conductive contacts may comprise metallic stampings, such as brass stampings or the like, and may support the light source therebetween. As shown in FIGS. 1 and 3, light source 24 may be oriented so as to be generally parallel to the reflective element of the mirror assembly 10 when module 20 is installed therein. For illustrative purposes, light source 24 is shown in this orientation. However, other orientations may be desired and selected, preferably such as arranging the light source to be generally parallel to the direction of travel of the vehicle, depending on the desired lighting by the light module, without affecting the scope of the present invention. In such a preferred orientation with the light source being generally parallel to the direction of travel of the vehicle, light radiating from the light source will radiate principally toward the left and right side of the light module and thus toward the driver and passenger sides of the vehicle when the light module and mirror assembly are installed in the vehicle.

The contacts 36a, 36b further include or are connected to respective connector portions 38a and 38b, which are preferably molded within housing 30 and extend from housing 30 at terminals 34a, 34b (as shown in FIGS. 4 and 5) for connection to an external power supply, such as to wire harness 22. The contacts may thus be directly supported by housing 30 and are preferably molded or insert molded within housing 30. As shown in FIG. 5, each connector portion 38a, 38b may be insert molded within housing 30 so as to provide electrical connection between terminals 34a, 34b and the respective contact 36a, 36b at generally opposite sides of the housing 30 and reflector 26.

Housing 30 (which is preferably formed of a plastic, non-conducting material, such as an ABS material or a resin filled polymer, such as a mineral or glass filled nylon or the like, which is preferably heat stable (such as described in U.S. Pat. No. 5,497,306, which is hereby incorporated herein by reference), thus may be molded around the connector portions and around the metal reflector to form a unitary molded module. Housing 30 may further include a control or connection or button or switch portion 30a which is molded around terminals 34a, 34b such that terminals 34a, 34b extend from portion 30a for connection to a corresponding connector or wires of the wire harness 22, such as a multi-pin connector or the like (or a single wire connector, depending on the application of the light module). As shown in FIG. 4, one of the terminals comprises a pair of terminal portions 34b, 34c, where terminal end portion 34b connects to the wire harness 22, while terminal portion 34c connects to the connector portion 38b. The connector portion 30a of housing 30 provides a cavity for a switch or button 32 for activating or deactivating the light source 24, such as via connecting/disconnecting terminal portion 34b to its respective portion 34c and thus to the respective connector portion 38b. With reference to FIG. 4, switch 32 may be pressed upward to move or index an electrically conductive contact plate or connector 40 upward to contact terminal 34b and portion 34c to close the circuit and activate light source 24. Contact plate 40 comprises an electrically conducting element which creates an electrical connection between terminal portions 34b, 34c. The switch may then be pressed a second time to move or index the contact plate 40 downward to disconnect terminal 34b and portion 34c to open the circuit and deactivate light source 24. The switch 32 may include a biasing member or spring 32a to bias the switch downward for access by the driver or passenger of the vehicle. Optionally, the switch or switches may utilize the principles described in U.S. Pat. Nos. 5,178,448 and 5,649,756, which are hereby incorporated herein by reference.

Optionally, housing 30 may comprise a substantially watertight housing molded around the button, reflector and light source to limit or substantially preclude any water or moisture entry into the reflector or to the electrical connectors, since the electrical connectors are substantially contained within the molded housing. Preferably, the components of the light module may be integrally molded in a molding process, or alternately, they may be formed separately and assembled together to form the light module, without affecting the scope of the present invention.

Illumination from light source 24 is reflected generally downward by reflector 26. Reflector 26 may comprise a vacuum metallized reflector or the like, to provide a reflective surface for reflecting and directing the light from light source 24 toward the targeted area. Preferably, reflector 26 comprises a metal stamping, which may provide a low cost reflector. Preferably, reflector 26 comprises a highly reflective surface, such as a polished metallic surface or the like. The reflector may be selected or designed to provide a desired light directing prescription, and may work in cooperation with the selected lens prescription, discussed below, to reflect and direct the light in a desired manner. The shape of reflector 26 may be selected depending on the application of light module 20 and the location of the light module 20 relative to the targeted areas. For example, reflector 26 may comprise a generally parabolic-shaped reflector or partially spherical-shaped reflector or the like, such as shown in FIGS. 1–5, or may comprise a reflector 26' having a compound curvature (FIG. 6) for directing the light from light source 24 to the targeted areas or areas, without affecting the scope of the present invention.

Lens or cover 28 may comprise a generally transparent lens which may be configured to shape and direct the light or illumination from light source 24 to the targeted area or areas. Lens 28 may comprise any type of lens or cover as desired, such as a Fresnel lens, such as disclosed in U.S. Pat. No. 6,042,253, which is hereby incorporated herein by reference, or a slightly curved molded plastic body having the general shape of an ellipse, which may be adapted to be scattering (such as by forming a stippled, scattering surface during molding of the lens element itself by providing a stippled surface in the mold cavity) to provide a diffused, translucent appearance, or a diffuse optic, a clear optic, a holographic optic, a binary optic, a sinusoidal optic, a diffractive optic or a tinted optic element or the like, such as disclosed in U.S. Pat. No. 5,669,698, which is hereby incorporated herein by reference. The lens or cover 28 may be removably mounted at housing 30 or reflector 26 (so as to allow for removal of lens 28 to replace the light source 24) or may be generally fixedly mounted thereto, and optionally may be molded to the housing, without affecting the scope of the present invention. In applications where the lens 28 is generally fixedly mounted to housing 30 or reflector 26, the light module 20 is preferably removably mounted at mirror assembly 10 to facilitate removal and replacement of the entire light module should the light source burn out or otherwise become inoperable.

In the illustrated embodiment, the light source, reflector and/or lens are selected and combined to provide and shape the illumination primarily at the central region of the vehicle, with reduced illumination at the driver and passenger sides of the vehicle. For example, the light module may provide illumination principally to the region generally between the driver and front passenger seats and, more preferably, may provide illumination toward one side or the other of the center region. Depending on the vehicle manufacturer, the light module may be selected to provide more illumination toward one side than the other. For example, the light module may provide illumination principally to the central region generally between the driver and front passenger seats, such as preferably at least approximately 30 Lux over a 300 mm area generally at the central region, more preferably at least approximately 50 Lux and most preferably at least approximately 70 Lux at the central region, while providing illumination at the driver side of the vehicle, such as preferably at least approximately 20 Lux over a 300 mm area generally at the driver seat or area of the vehicle, more preferably at least approximately 40 Lux and most preferably at least approximately 60 Lux at the driver area, and illumination generally at the front passenger seat or area of the vehicle, such as preferably at least approximately 10 Lux over a 300 mm area at the front passenger area of the vehicle, more preferably at least approximately 25 Lux and most preferably at least approximately 40 Lux at the front passenger area of the vehicle. For example, the light module may provide illumination of approximately 60 Lux over about a 300 mm area at the driver's side of the vehicle, and illumination of approximately 100 Lux over about a 300 mm area at the center region of the vehicle, and illumination of approximately 40 Lux over about a 300 mm area at the passenger side of the vehicle. Clearly, however, other illumination shapes and illumination intensities and targeted areas may be provided by the light module, without affecting the scope of the present invention.

Although shown as having a light module of the present invention at one side of the toggle assembly of the rearview mirror assembly (such as the driver side as shown in FIG. 1), it is envisioned that a light module in accordance with the present invention may be positioned at either or both sides of the mirror assembly, without affecting the scope of the present invention. For example, a light module may be positioned at each side of the central toggle of the mirror assembly and operable to illuminate or direct illumination toward a respective side of the vehicle. In such applications, each light module may have its own separate wire harness connection to the power source of the vehicle (such as to the vehicle wire harness at the headliner of the vehicle), or a single wire harness may be routed from the vehicle wire harness at the headliner to the mirror assembly, whereby the mirror assembly may have a splitter to connect to the wire harness to split the lines to provide electrical connection to each light module, such as in a manner as described above. Optionally, a single switch or control input may then control both light modules, or each light module may include and be operable by a respective switch or control input, without affecting the scope of the present invention. It is further envisioned that a light module in accordance with the present invention may be centrally mounted at an interior rearview mirror assembly having a toggle or flip member or element positioned toward one side of the mirror assembly, without affecting the scope of the present invention. In such an embodiment, the light module may provide illumination toward the central region of the front seating area and/or to one or both side regions. It is also further envisioned that a light module in accordance with the present invention may be mounted at a central or side portion or side portions of an electro-optic or electrochromic interior rearview mirror assembly (such as discussed above), without affecting the scope of the present invention.

Although shown and described as being mounted at an interior rearview mirror assembly, the light module of the present invention may be equally suitable for use with or at or in a windshield electronics module or accessory module or overhead accessory system or module, without affecting the scope of the present invention. For example, the light module of the present invention may be incorporated into a windshield electronics module or accessory module of the types described in U.S. Pat. Nos. 6,243,003; 6,278,377 and 6,420,975, U.S. patent applications, Ser. No. 10/355,454, filed Jan. 31, 2003 by Schofield et al. for VEHICLE ACCESSORY MODULE, now U.S. Pat. No. 6,824,281; Ser. No. 09/793,002, filed Feb. 26, 2001 by Schofield et al., entitled VIDEO MIRROR SYSTEMS INCORPORATING AN ACCESSORY MODULE, now U.S. Pat. No. 6,690,268; Ser. No. 10/054,633, filed Jan. 22, 2002 by Lynam et al. for VEHICULAR LIGHTING SYSTEM; Ser. No. 10/307,929, filed Dec. 2, 2002 by Hutzel et al. for AN INTERIOR REARVIEW MIRROR SYSTEM INCLUDING A PENDENT ACCESSORY now U.S. Pat. No. 6,902,284; and Ser. No. 09/839,678, filed Apr. 20, 2001 by McCarthy et al. for VEHICLE MIRROR ASSEMBLY COMMUNICATING WIRELESSLY WITH VEHICLE ACCESSORIES AND OCCUPANTS, now U.S. Pat. No. 6,693,517, International Publication No. WO 01/64481, published Sep. 7, 2001, and/or PCT Application No. PCT/US03/40611, filed Dec. 19, 2003 by Donnelly Corporation et al. for ACCESSORY SYSTEM FOR VEHICLE, which are all hereby incorporated herein by reference.

Therefore, the present invention provides a unitary light module which may be installed at an interior rearview mirror assembly and connected to a wire harness at the mirror assembly, whereby the unitary light module comprises a completely workable and usable light module requiring only electrical connection to the wire harness or power source. The light module may thus provide a low cost light module to a low cost prismatic interior rearview mirror assembly, without requiring additional electrical controls or components or connections. The light module may be positioned at either or both sides of the mirror assembly and may be directed toward one or more targeted areas within the cabin of the vehicle. The light source, reflector and/or lens may be selected and combined to direct illumination toward the desired targeted area or areas of the vehicle. The light source of the present invention thus provides a unitary light module, which may be provided by a separate light module manufacturer than the mirror manufacturer, and which may be installed within the casing of the mirror assembly without requiring any additional connections or controls and, thus, facilitates the provision of a low cost light module to a low cost interior rearview mirror assembly, while avoiding the additional components and processes of the prior art mirror assemblies.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. An interior rearview mirror assembly for a vehicle, said interior rearview mirror assembly comprising:
   a mirror casing;
   a reflective element; and
   a light module, said light module being positionable at least partially within said mirror casing, said light module comprising an illumination source, a housing generally surrounding said illumination source, and a cover generally encasing said illumination source within said housing, said housing comprises a polymeric material, said light module including an electrical connector for electrically connecting said light module to an electrical conductor of said mirror assembly when said light module is positioned at least partially within said mirror casing, said light module including a user actuatable input for activating and deactivating said illumination source, wherein said electrical connector comprises conductive elements that are molded within said housing.

2. The interior rearview mirror assembly of claim 1, wherein said illumination source comprises a festoon light source.

3. The interior rearview mirror assembly of claim 1, wherein said conductive elements include light contacts for electrically contacting said illumination source, said light contacts being exposed at an inner surface of said housing for contacting said illumination source.

4. The interior rearview mirror assembly of claim 3, wherein said light contacts are configured to support said illumination source between opposite contacts.

5. The interior rearview mirror assembly of claim 4, wherein said illumination source comprises a festoon light source.

6. The interior rearview mirror assembly of claim 1, wherein at least one of said conductive elements is electrically connected to said user actuatable input, said user actuatable input being electrically connected to said electrical conductor of said mirror assembly.

7. The interior rearview mirror assembly of claim 1, wherein said housing includes a reflective surface positioned substantially over an inner surface of said housing, said reflective surface being configured to direct illumination from said illumination source generally through said cover.

8. The interior rearview mirror assembly of claim 1, wherein said cover is attached to said housing.

* * * * *